(12) United States Patent
Weems et al.

(10) Patent No.: US 10,368,486 B2
(45) Date of Patent: Aug. 6, 2019

(54) LAWN MOWER WITH IMPROVED CUTTING STRUCTURE

(71) Applicant: Wright Manufacturing, Inc., Frederick, MD (US)

(72) Inventors: Corey M. Weems, Frederick, MD (US); Edward R. Wright, Frederick, MD (US)

(73) Assignee: Wright Manufacturing, Inc., Frederick, MD (US)

(*) Notice: Subject to any disclaimer, the term of this patent is extended or adjusted under 35 U.S.C. 154(b) by 0 days.

(21) Appl. No.: 15/232,839

(22) Filed: Aug. 10, 2016

(65) Prior Publication Data

US 2017/0000023 A1   Jan. 5, 2017

Related U.S. Application Data

(62) Division of application No. 14/303,861, filed on Jun. 13, 2014.

(51) Int. Cl.
| | |
|---|---|
| *A01D 34/00* | (2006.01) |
| *A01D 34/81* | (2006.01) |
| *A01D 34/66* | (2006.01) |
| *A01D 57/01* | (2006.01) |
| *A01D 34/76* | (2006.01) |
| *A01D 101/00* | (2006.01) |

(52) U.S. Cl.
CPC ............. *A01D 34/81* (2013.01); *A01D 34/66* (2013.01); *A01D 34/664* (2013.01); *A01D 34/76* (2013.01); *A01D 57/01* (2013.01); *A01D 2101/00* (2013.01)

(58) Field of Classification Search
CPC ................................ A01D 34/81; A01D 34/667

USPC ............................................ 56/320.1, 320.2
See application file for complete search history.

(56) References Cited

U.S. PATENT DOCUMENTS

| | | | |
|---|---|---|---|
| 4,920,733 A | 5/1990 | Berrios | |
| 5,133,176 A * | 7/1992 | Baumann | A01D 34/005 56/17.4 |
| 5,964,082 A | 10/1999 | Wright et al. | |
| 6,138,446 A | 10/2000 | Velke et al. | |
| 6,189,304 B1 | 2/2001 | Velke et al. | |
| 6,390,225 B2 | 5/2002 | Velke et al. | |
| 6,438,930 B1 | 8/2002 | Velke et al. | |
| 6,560,952 B2 | 5/2003 | Velke et al. | |
| 6,658,831 B2 | 12/2003 | Velke et al. | |
| 7,428,884 B2 | 9/2008 | Velke et al. | |
| 7,574,852 B1 * | 8/2009 | Loxterkamp | A01D 34/005 56/320.2 |
| 8,028,508 B2 * | 10/2011 | Imanishi | A01D 34/667 56/320.1 |
| 2001/0001170 A1 | 5/2001 | Velke et al. | |

(Continued)

OTHER PUBLICATIONS

U.S. Appl. No. 14/303,861, filed Jun. 13, 2014; Weems et al.

*Primary Examiner* — Thomas B Will
*Assistant Examiner* — Mai T Nguyen
(74) *Attorney, Agent, or Firm* — Nixon & Vanderhye P.C.

(57) ABSTRACT

In certain example embodiments of this invention, the lawn mower includes one or more of: (a) cutter deck baffle teeth for improving cutting performance; (b) a trim divider edge portion of the cutter deck for improving cutting performance; (c) a trim vacuum structure portion of the cutter deck for improving cutting performance; and/or (d) a center vacuum structure portion of the cutter deck for improving cutting performance.

4 Claims, 16 Drawing Sheets

(56) References Cited

U.S. PATENT DOCUMENTS

2002/0059788 A1   5/2002  Velke et al.
2005/0126146 A1   6/2005  Velke et al.
2015/0359169 A1  12/2015  Weems et al.
2015/0359173 A1  12/2015  Wright et al.
2016/0345496 A1  12/2016  Weems et al.
2017/0000023 A1   1/2017  Weems et al.

* cited by examiner

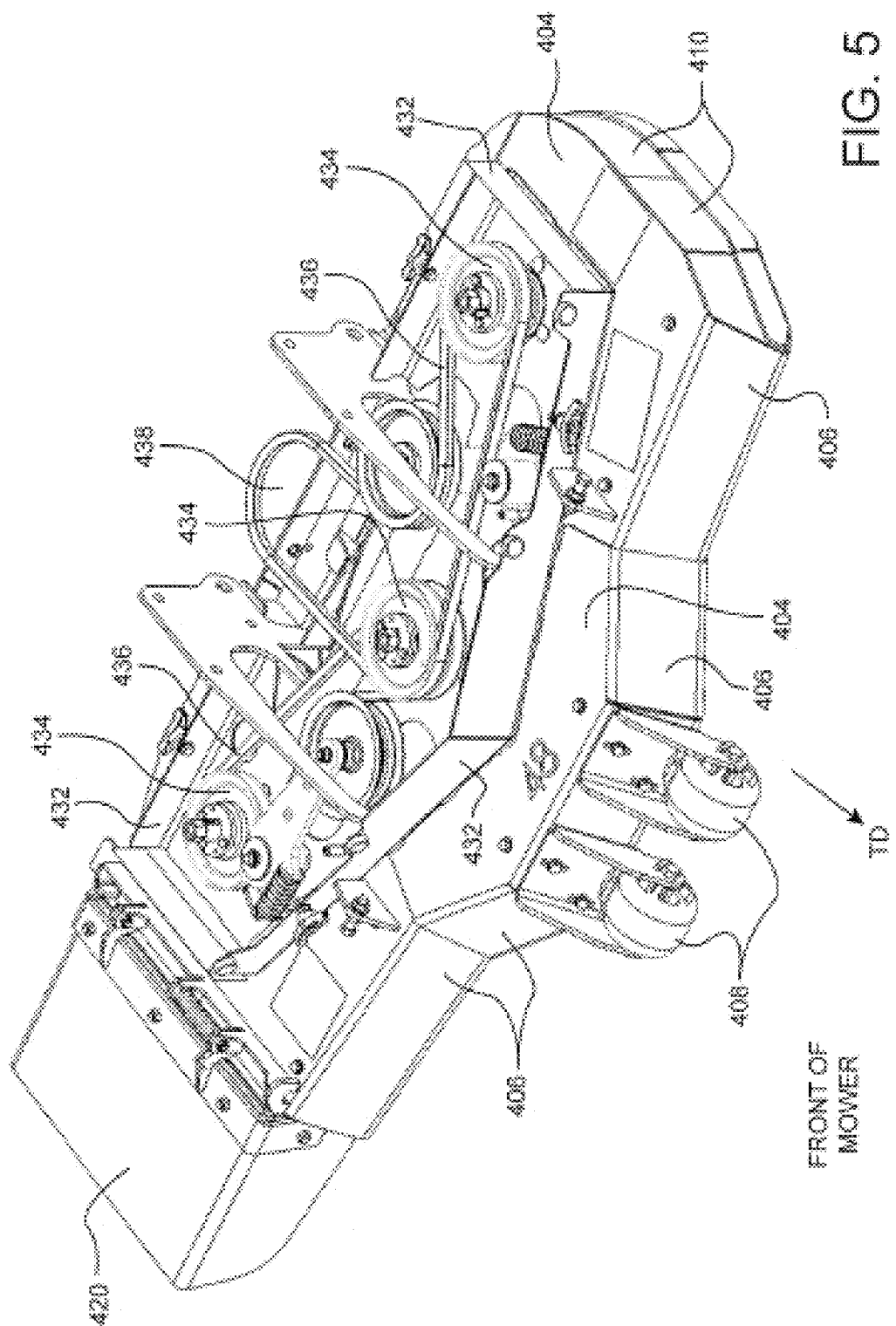

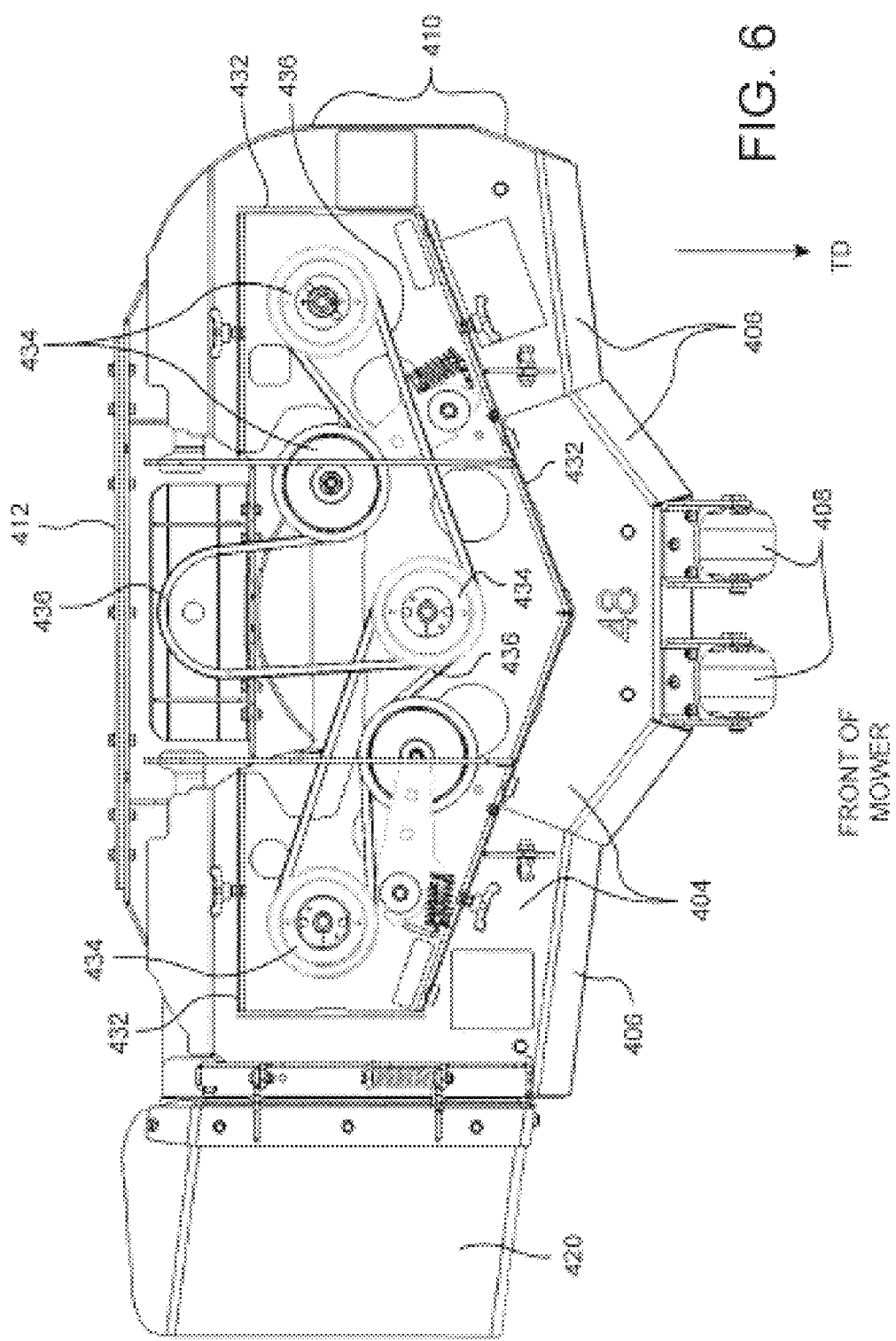

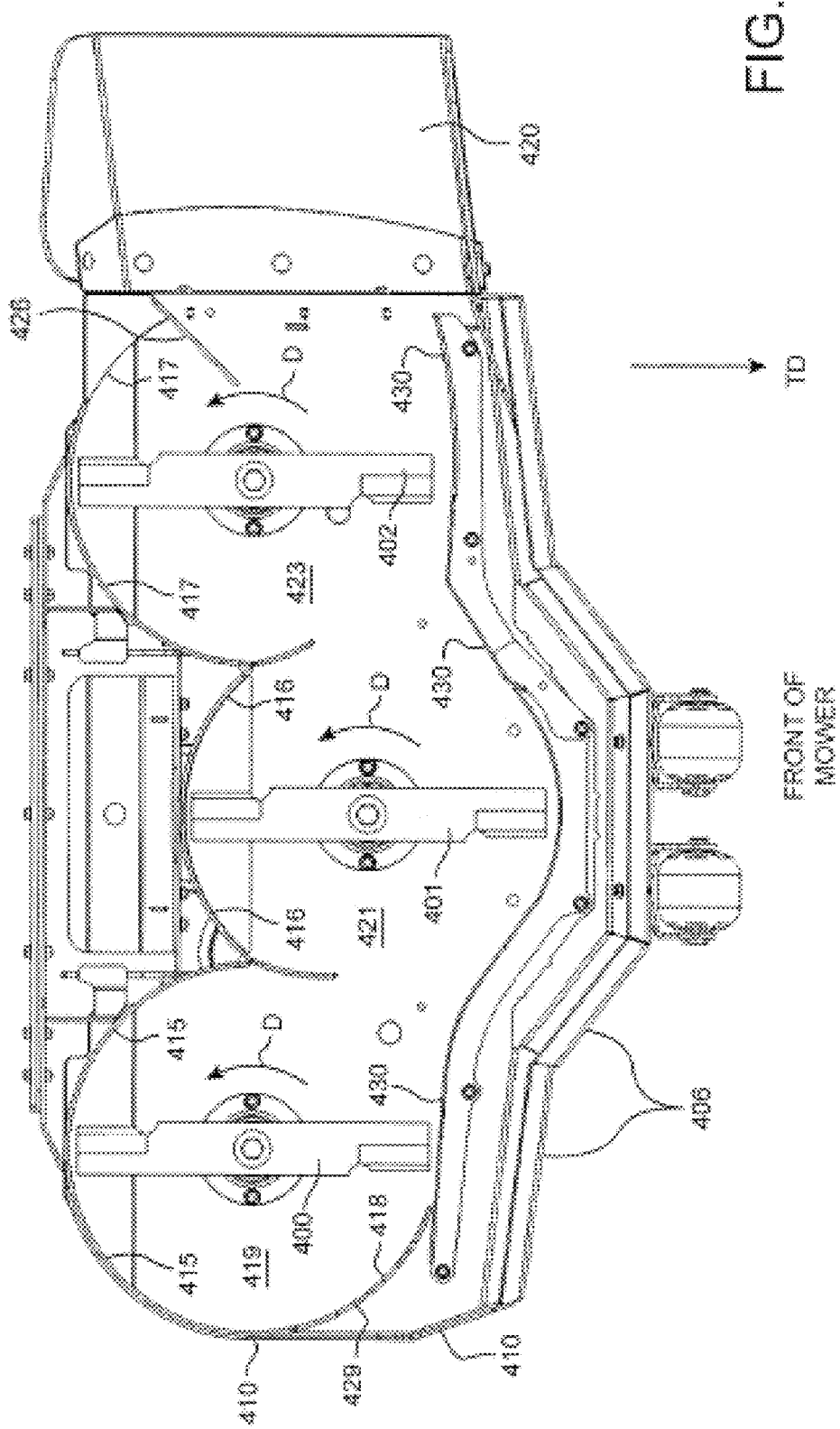

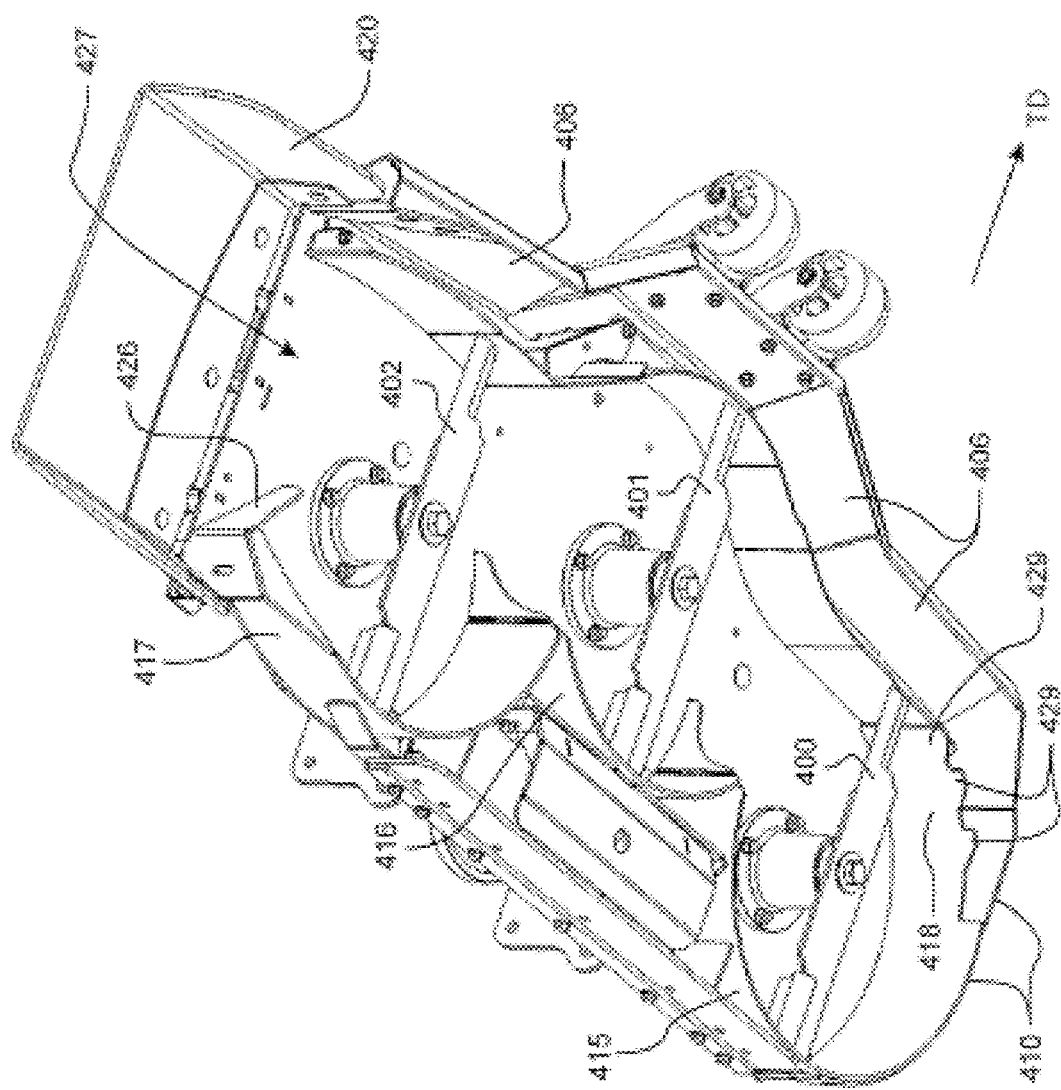

FIG. 9  FRONT OF MOWER

LAWN MOWER WITH IMPROVED CUTTING STRUCTURE

This invention relates to a lawn mower. In certain example embodiments of this invention, the lawn mower includes one or more of: (a) cutter deck baffle teeth for improving cutting performance; (b) a trim divider edge portion of the cutter deck for improving cutting performance; (c) a trim vacuum structure portion of the cutter deck for improving cutting performance; and/or (d) a center vacuum structure portion of the cutter deck for improving cutting performance.

BACKGROUND OF THE INVENTION

Lawn mowers are known in the art. For example, stand-on mowers are discussed in U.S. Pat. Nos. 6,138,446, 6,390,225, 6,189,304, 6,438,930, 6,658,831, 6,560,952, 7,428,884 and 5,964,082, the disclosures of all of which are all hereby incorporated herein by reference. Example walk-behind lawn mowers are discussed in U.S. Patent Documents 2005/0126146 and U.S. Pat. No. 4,920,733, the disclosures of which are all hereby incorporated herein by reference. Example mower operable by seated occupants are discussed in U.S. Patent Documents 2001/0001170, 2002/0059788, U.S. Pat. Nos. 6,438,930, 6,658,831, and 6,560,952, the disclosures of which are all hereby incorporated herein by reference.

FIGS. 1-4 illustrates different features of an example commercial mower, found in U.S. Pat. No. 6,138,446. The mower includes cutter deck 1, engine deck 3, a pair of front castor wheels 5, a pair of rear drive wheels 7, thigh pad 13 for permitting the operator to rest his/her thighs thereon during operation, support assembly 15 extending upwardly at an angle from engine deck 3 so as to support thigh pad 13 and handle control assembly 11, combustion engine 9, and operator support platform structure 18 which includes pivotal platform sheet 234 for supporting feet of an operator during mower operation. The handle control assembly 11 includes rigid handle bar 10 fixedly attached to supports 15, reverse control levers 17, and forward control levers 19. Control levers 17 and 19 are pivotally affixed to supports 15 about axis 21 so that the standing operator can control the steering of the mower via the rear drive wheels 7 by pivoting levers 17 and/or 19 during operation. The mower is of the zero radius turning type in certain example embodiments, with the wheels being hydraulically driven. When the mower is driven forward, it travels forward in travel direction TD when cutting grass.

Hydraulically driven (i.e., hydrostatically controlled) mowers often include a pair of drive wheels, each of which is independently operated by a hydraulic (i.e., Hydrostatic) pump coupled to the mower's engine. A corresponding motor may be provided for each drive wheel, each motor being powered and controlled by one of the hydro pumps. Each pump typically includes a control lever for regulating fluid pressure and direction to its corresponding motor so that the drive wheels can be independently controlled so that each may be rotated at variable speeds in both forward and reverse directions. In this manner, the mower may be steered by controlling the speed and direction of the two drive wheels, and may be referred to as a zero radius turning mower. Zero radius turns are typically performed when the two drive wheels are operated at approximately the same speed but in opposite directions so that the mower pivots or turns about a vertical axis extending upwardly from a location between the drive wheels. In the FIG. 1-4 mower, the hydraulically controlled drive wheels 7 are considered rear drive wheels.

FIG. 2 illustrates standing platform supporting structure (with certain exceptions such as support sheet 234) shown generally by reference numeral 18. The supporting, structure 18 includes support sheet 234 for supporting an operator's feet during mower operation, sidewalls 151 for isolating the operator's feet from the drive wheels 7 and their motors, vertical surface 153, elongated annular bar 155 welded to the platform structure so as to give structure for wheel motor brackets 157 on both sides of the platform, a pair of motor brackets 157, rigid channel shaped member 159 disposed between sidewalls 151, a rest 160 for the front of the standing platform, handlebar upright base members 163, via holes 165 for attachment purposes, support surface 164, and mounting holes 169 provided on each sidewall for permitting wheel motor brackets 157 to be affixed to the sidewalls.

FIGS. 3(a)-3(b) illustrate the handle bar support assembly and other items from the rear of the prior art mower. The assembly includes sheet metal supports 15 on either side of the mower, central bends 23 in supports 15, dash panel 27, pivots 63, bend sections 143 at the bottom areas of supports 15 for bolting supports 15 to the engine deck, cutter deck 1, operator foot platform 18, rear drive wheels 7, and platform sidewalls 151.

FIG. 4 illustrates the cutter deck 1 and a deck belt cover 331 (including wall 340) for resting thereon. The entire structure shown in FIG. 4 may be considered part of the cutter deck or cutter deck assembly. The cutter deck 1 in this non-limiting example instance includes top deck surface 602, wall 191 which extends from upper surface 602 of the cutter deck for housing pulleys and the like, vertical housing wall 181 located around the periphery of the cutter deck (mower deck), cutting blades (not shown in FIG. 4) located beneath top surface 602, cover 331 which rests on post members 332 and caps 333 when knobs 334 are tightened down, threaded studs 335 attached into idler pivot pin 336 in order to align cover 331 and knobs 334, and idler arms 339 which rotate on pins 336. The tops of idler pivots pins 336 may be slightly lower in elevation than the tops of caps 333.

FIGS. 1-4 have been provided to illustrate general components of an example non-limiting lawn mower. Further details of the structure shown in FIGS. 1-4 may be found in U.S. Pat. No. 6,138,446, the disclosure of which is hereby incorporated herein by reference.

While the aforesaid lawn mowers are desirable for many uses, they can also be improved in certain respects such as with respect to improving cutting performance.

BRIEF SUMMARY OF EXAMPLE EMBODIMENTS OF THE INVENTION

This invention relates to a lawn mower. In certain example embodiments of this invention, the lawn mower includes one or more of: (a) cutter deck baffle teeth for improving cutting performance; (b) a trim divider edge portion of the cutter deck for improving cutting performance; (c) a trim vacuum structure portion of the cutter deck for improving cutting performance; and/or (d) a center vacuum structure portion of the cutter deck for improving cutting performance. Example mowers according to this invention may include one of these features (a)-(d), two of these features, three of these features, or all four of these features in different example embodiments of this invention.

In certain example embodiments of this invention, there is provided a lawn mower comprising: a combustion engine for driving a plurality of rotating cutting blades that are part of a cutter deck structure; and wherein the cutter deck structure comprises a trim baffle that helps define a cutting chamber, the trim baffle including a plurality of teeth defined at a bottom edge thereof in order to help vegetation to be directed into a path of at least one of the rotating cutting blades.

In certain example embodiments of this invention, there is provided a lawn mower comprising: an engine for driving a plurality of rotating cutting blades that are part of a cutter deck structure; and wherein the cutter deck structure comprises a diverter edge at a side of the cutter deck structure, the diverter edge extending downwardly to an elevation below an elevation at which a leading edge of the cutter deck structure is provided in order to help reduce occurrences of long vegetation from sliding around a side of the cutter deck structure during mowing operations.

In certain example embodiments of this invention, there is provided a lawn mower comprising: an engine for driving a plurality of rotating cutting blades that are part of a cutter deck structure; and wherein the cutter deck structure comprises an inclined surface extending downward from a substantially planar surface of the cutter deck structure, the inclined surface being inclined at an angle of from about 15 to 50 degrees relative to the substantially planar surface of the cutter deck structure in order to improve cutting characteristics of the mower.

BRIEF DESCRIPTION OF THE DRAWINGS

FIG. 3(*b*) is a rear elevational view of the handle mechanism assembly and engine deck structure of the FIGS. 1 and 3(*a*) mower, with the rear wheel assembly, dash, and handle bars having been added compared to FIG. 3(*a*).

FIG. 5 is a top front perspective view of a cutter deck structure for use on a mower, according to an example embodiment of this invention.

FIG. 6 is a top view of the cutter deck structure of FIG. 5.

FIG. 7 is a bottom view of the cutter deck structure of FIGS. 5-6.

FIG. 8 is a perspective view from the bottom right/rear of the cutter deck structure of FIGS. 5-7.

Figure 9:
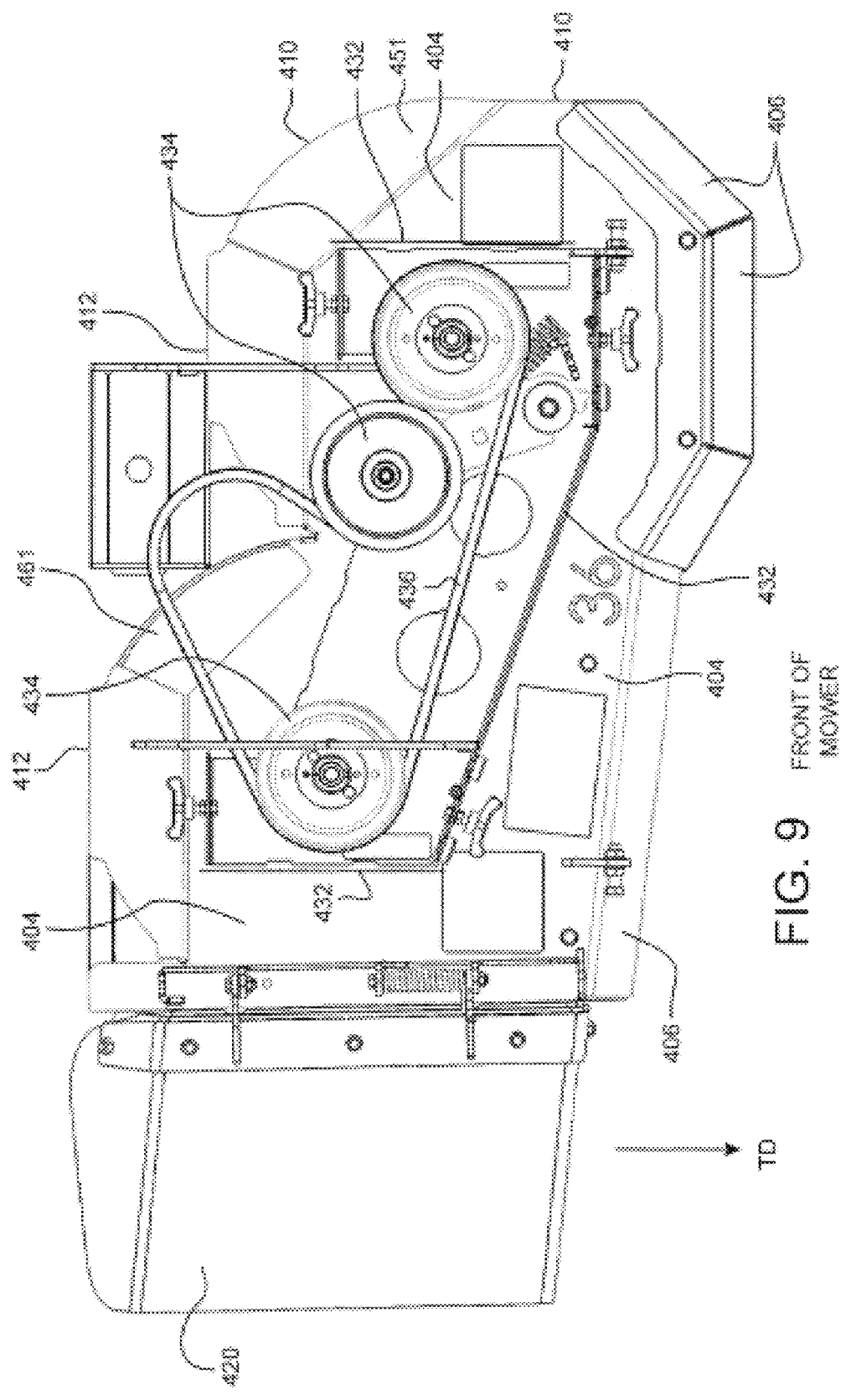

FIG. 9 is a top view of a cutter deck structure for use on a mower according to another example embodiment of this invention.

DETAILED DESCRIPTION OF EXAMPLE EMBODIMENTS OF THE INVENTION

Figure 1:
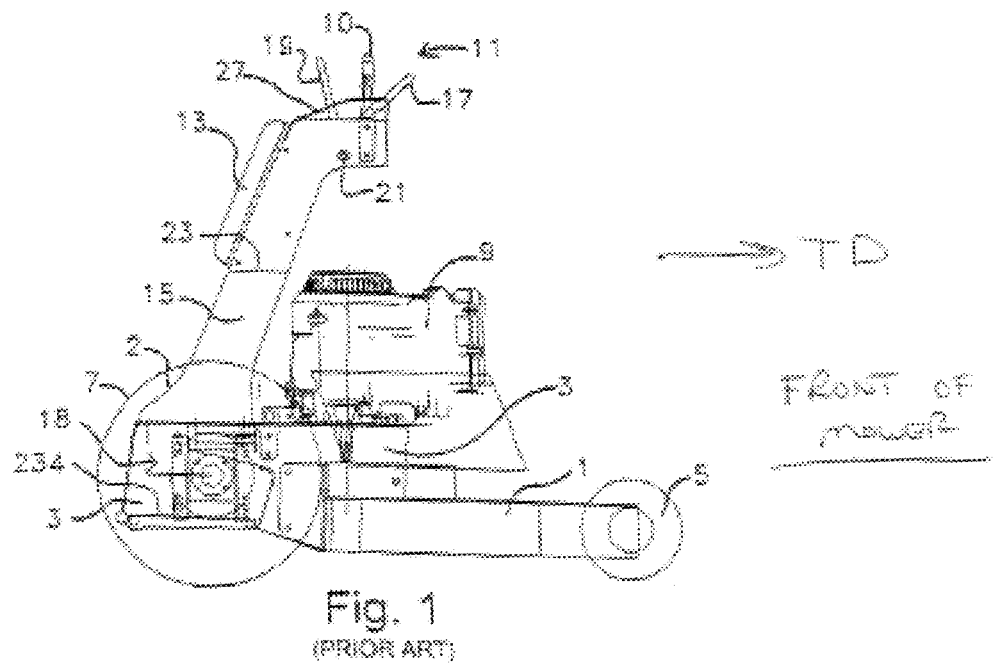
FIG. 1 is a side view of a conventional stand-on lawn mower.

Referring now more particularly to the accompanying drawings in which like reference numerals indicate like parts throughout the several views.

Figure 2:
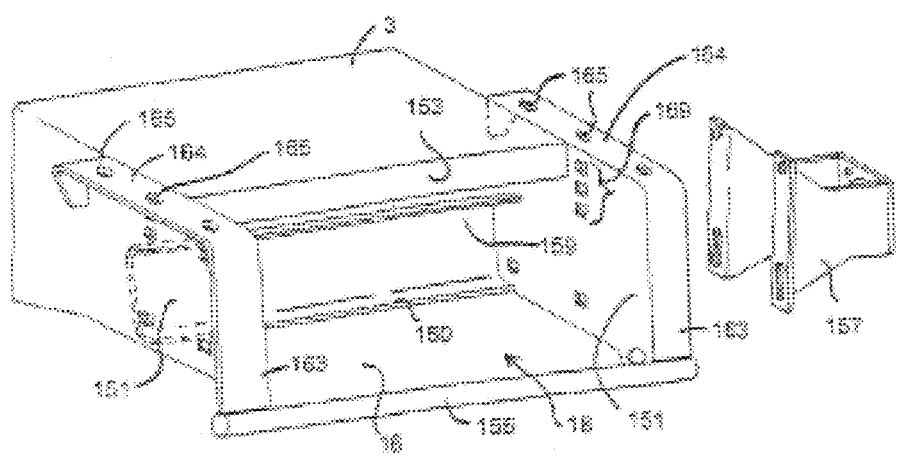
FIG. 2 is a partially exploded elevational view of a conventional engine deck structure and operator support structure of the mower of FIG. 1.
Figure 3A:
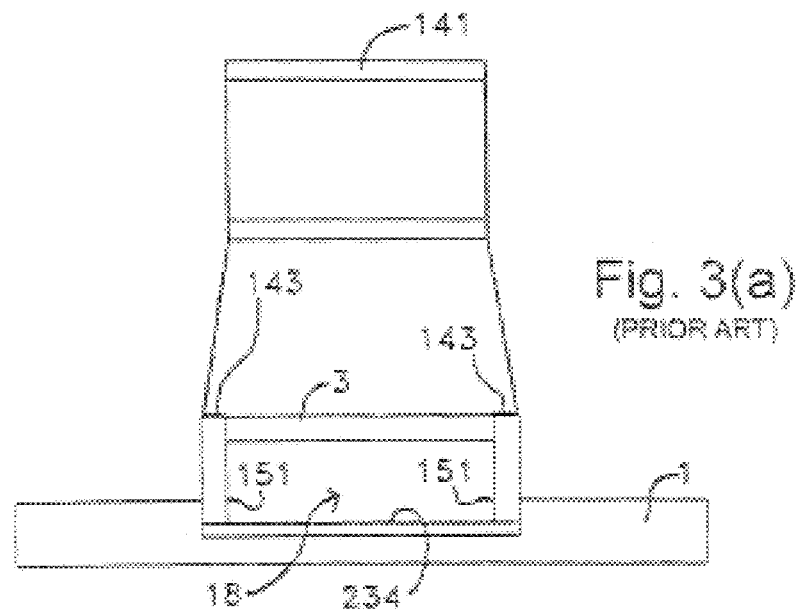
FIG. 3(*a*) is a rear elevational view of the conventional handle mechanism assembly and engine deck structure of FIG. 1.
Figure 3B:
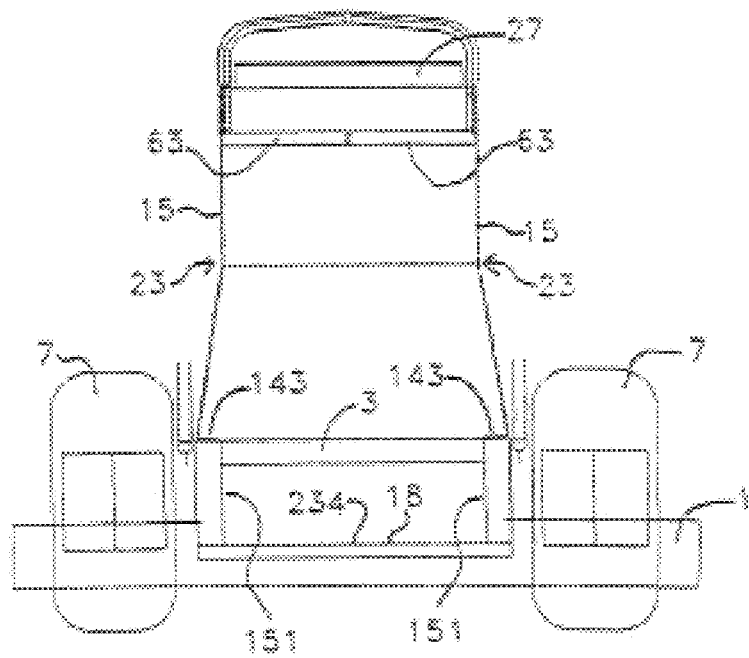
Figure 4:
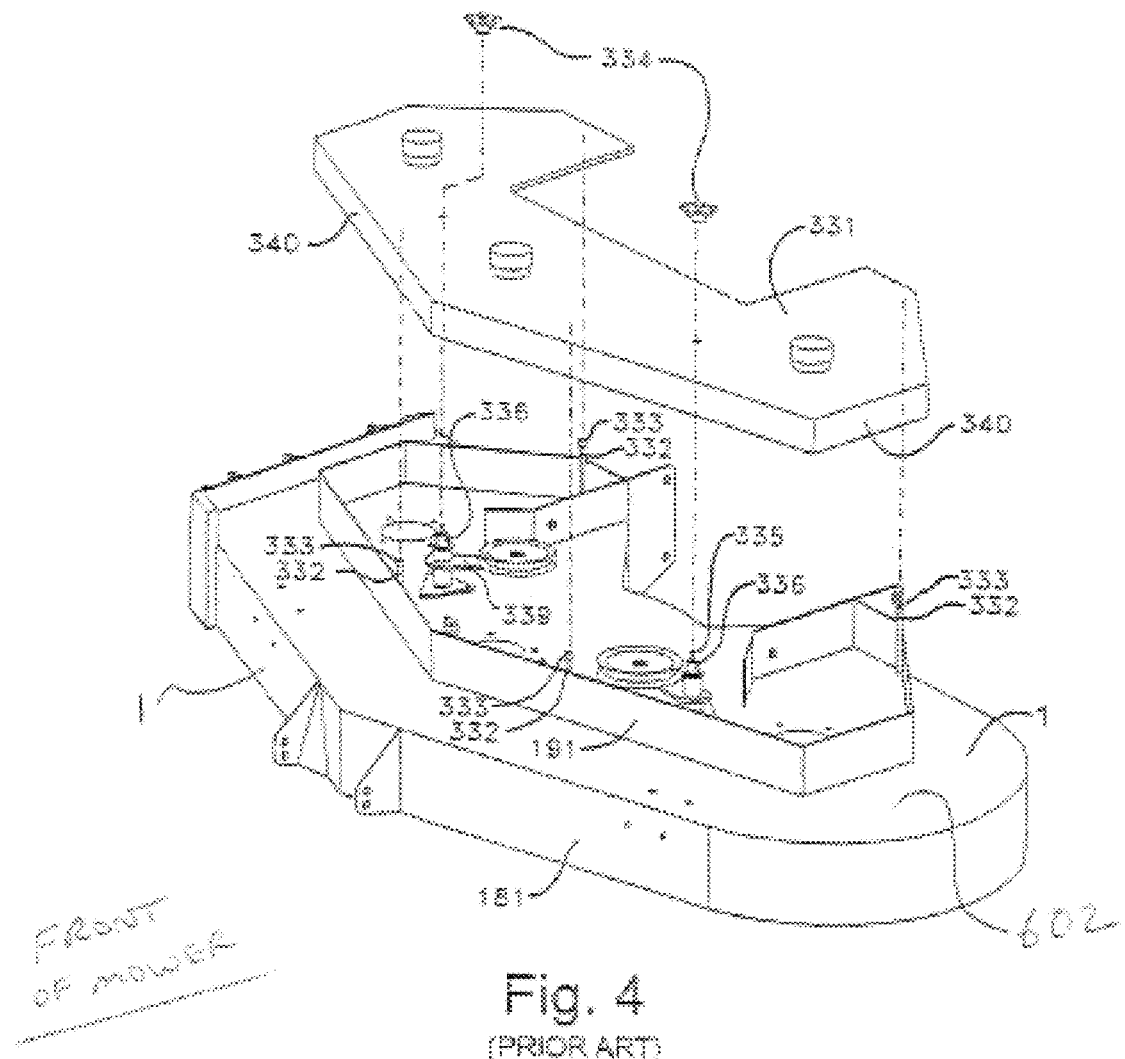
FIG. 4 is a perspective view of a conventional cutter deck of the mower of FIGS. 1-3.
Figure 10:
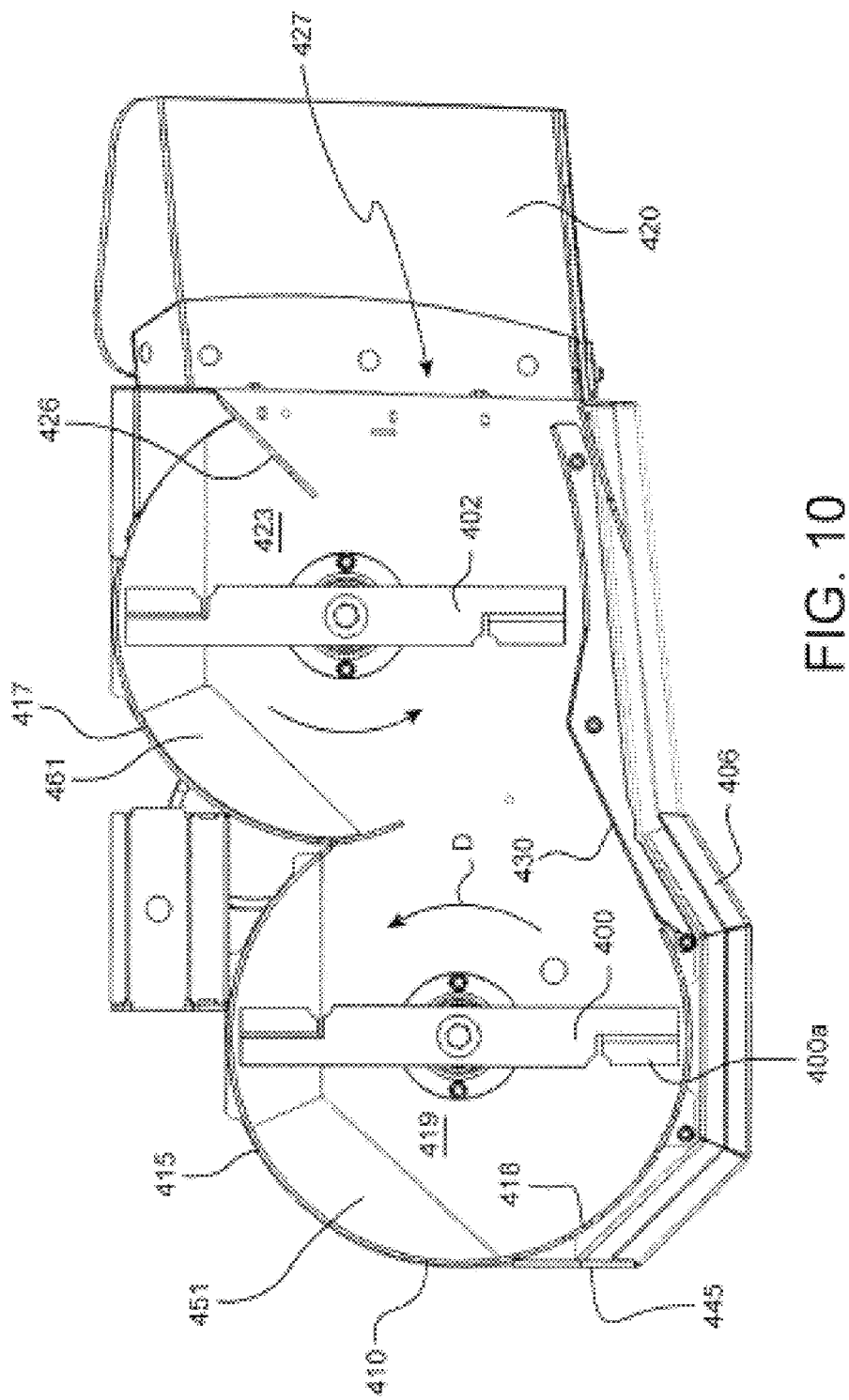
FIG. 10 is a bottom view of the cutter deck structure of FIG. 9.
Figure 11:
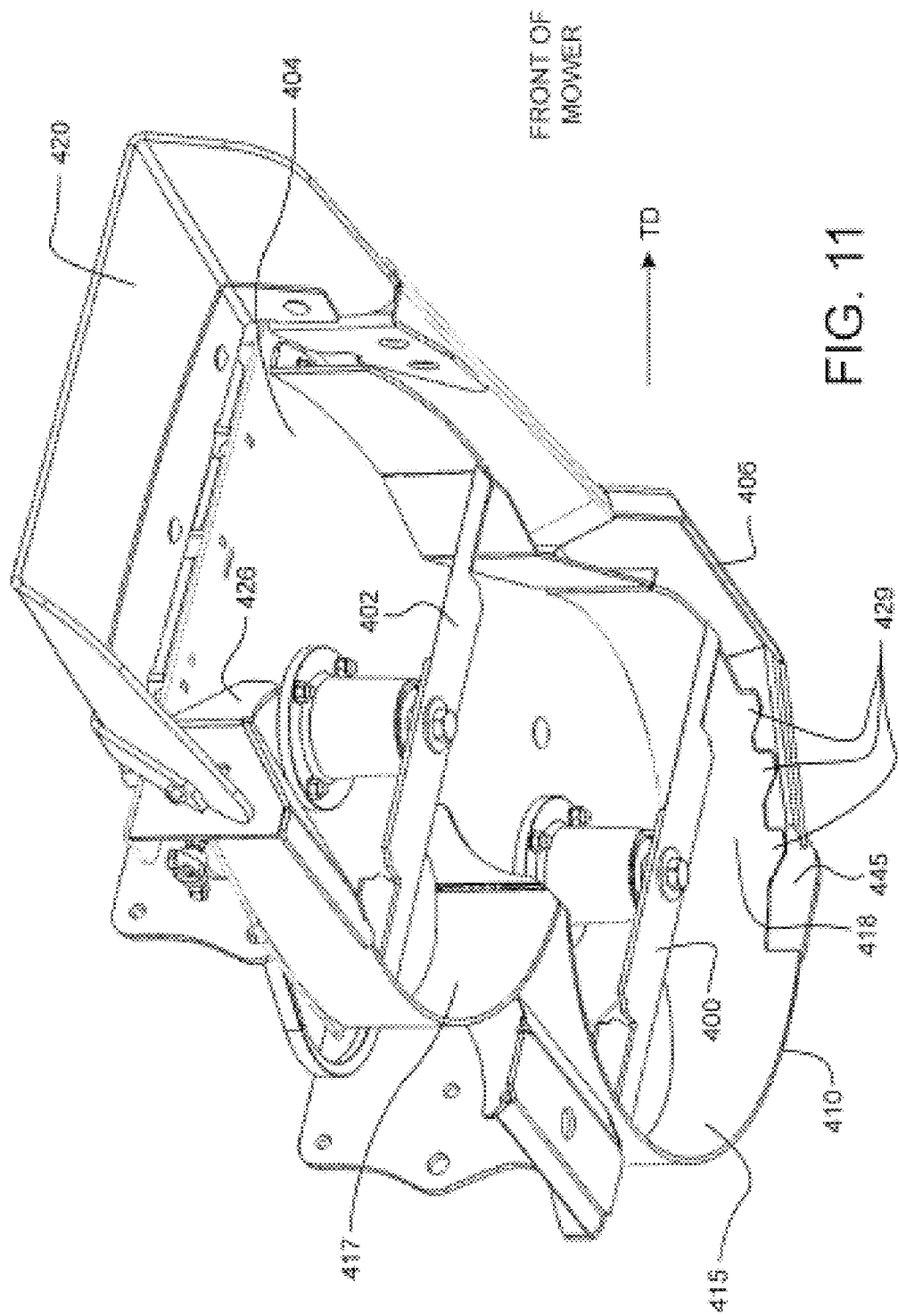
FIG. 11 is a perspective view from the bottom right/rear of the cutter deck structure of FIGS. 9-10.
Figure 12:
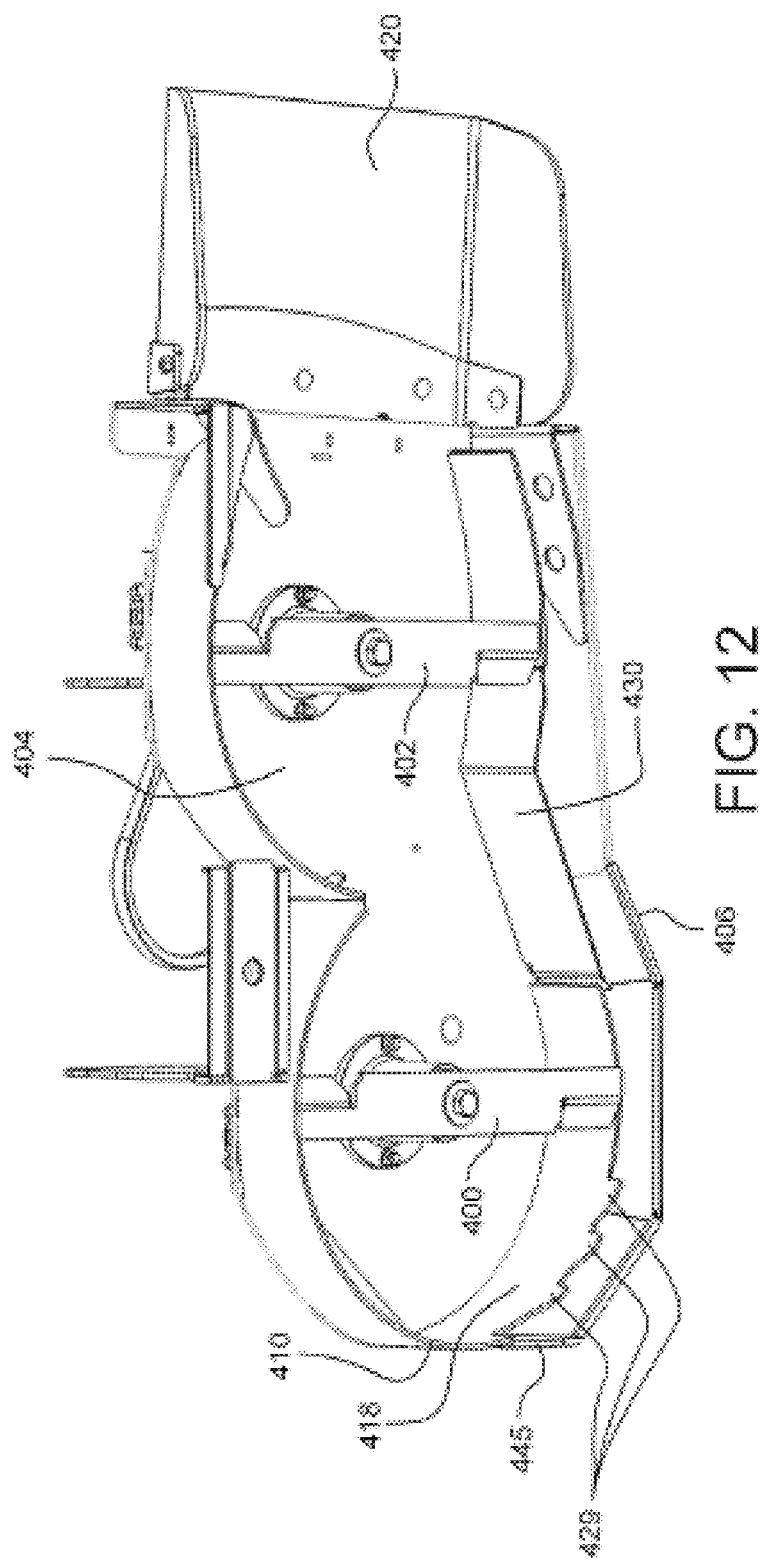
FIG. 12 is a perspective view from the bottom rear of the cutter deck structure of FIGS. 9-11.
Figure 13:
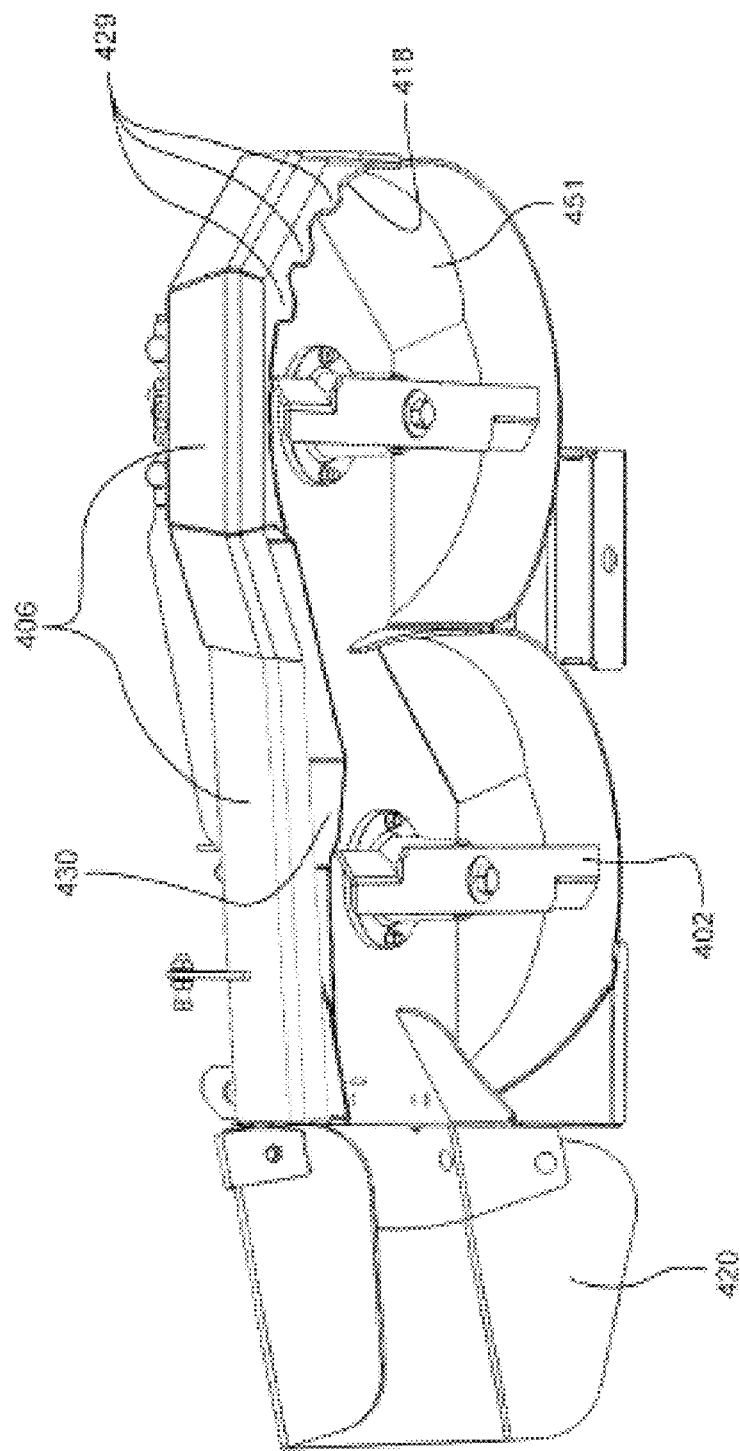
FIG. 13 is a perspective view from the bottom front of the cutter deck structure of FIGS. 9-12.
Figure 14:
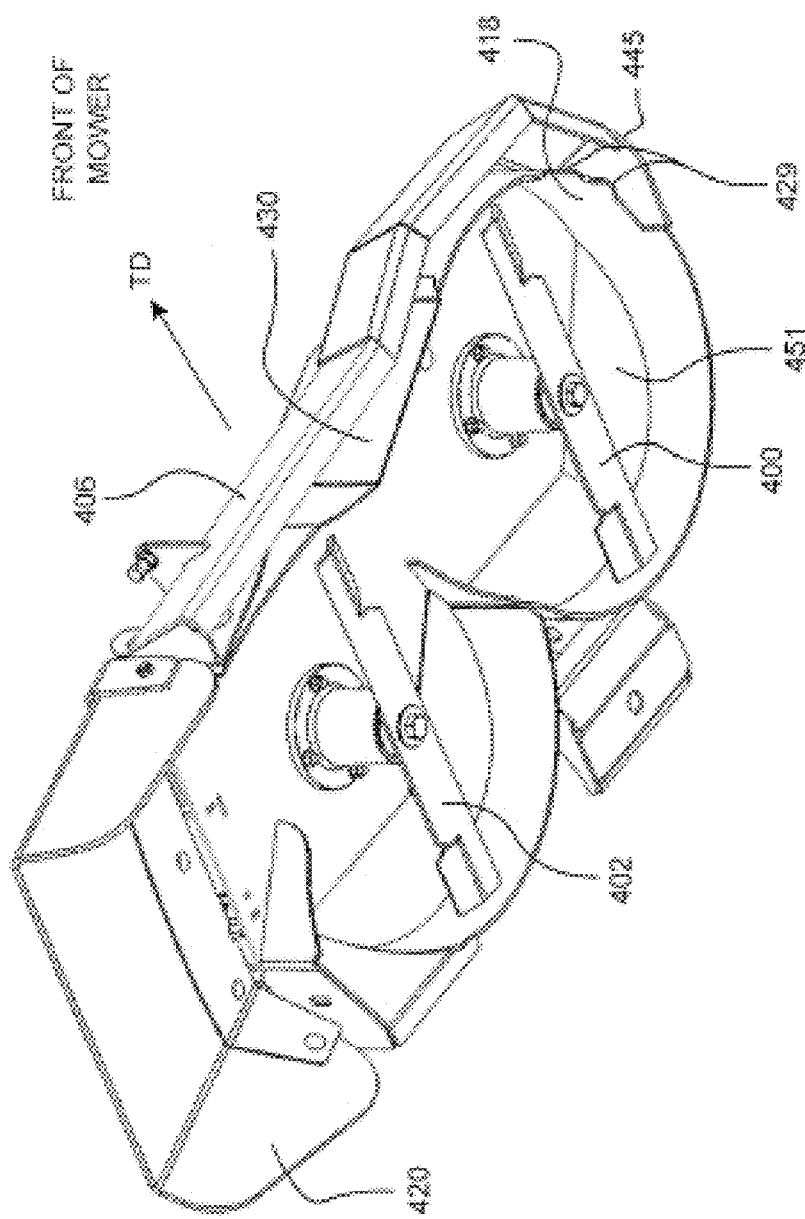
FIG. 14 is a perspective view from the bottom front/right of the cutter deck structure of FIGS. 9-13.
Figure 15:
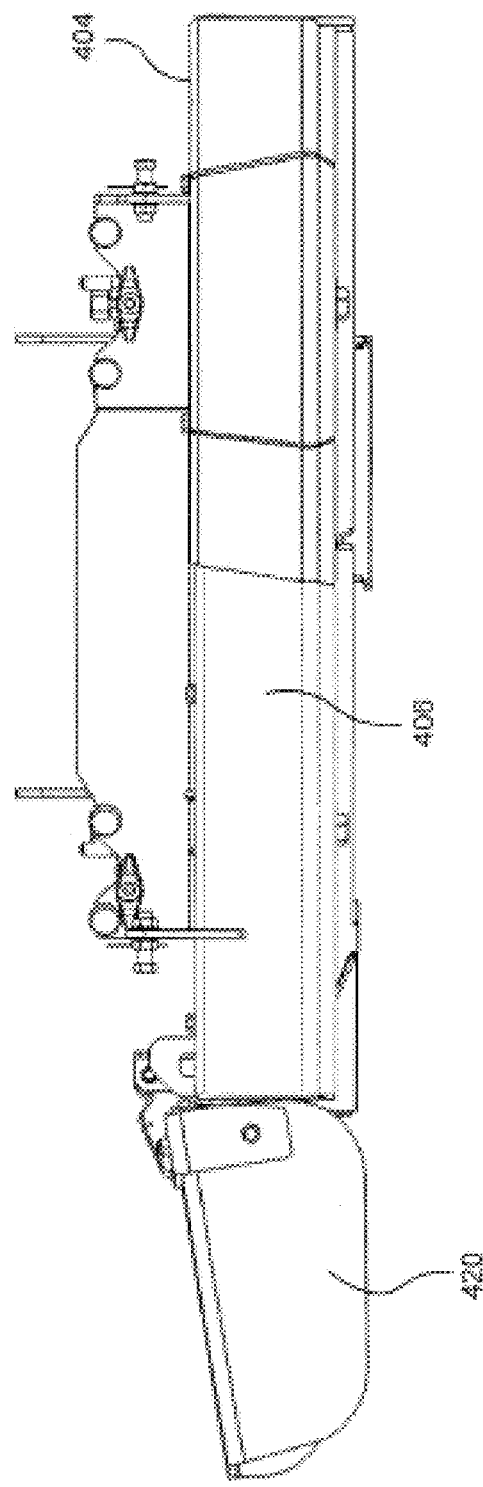
FIG. 15 is a front plan view of the cutter deck structure of FIGS. 9-14.
Figure 16:
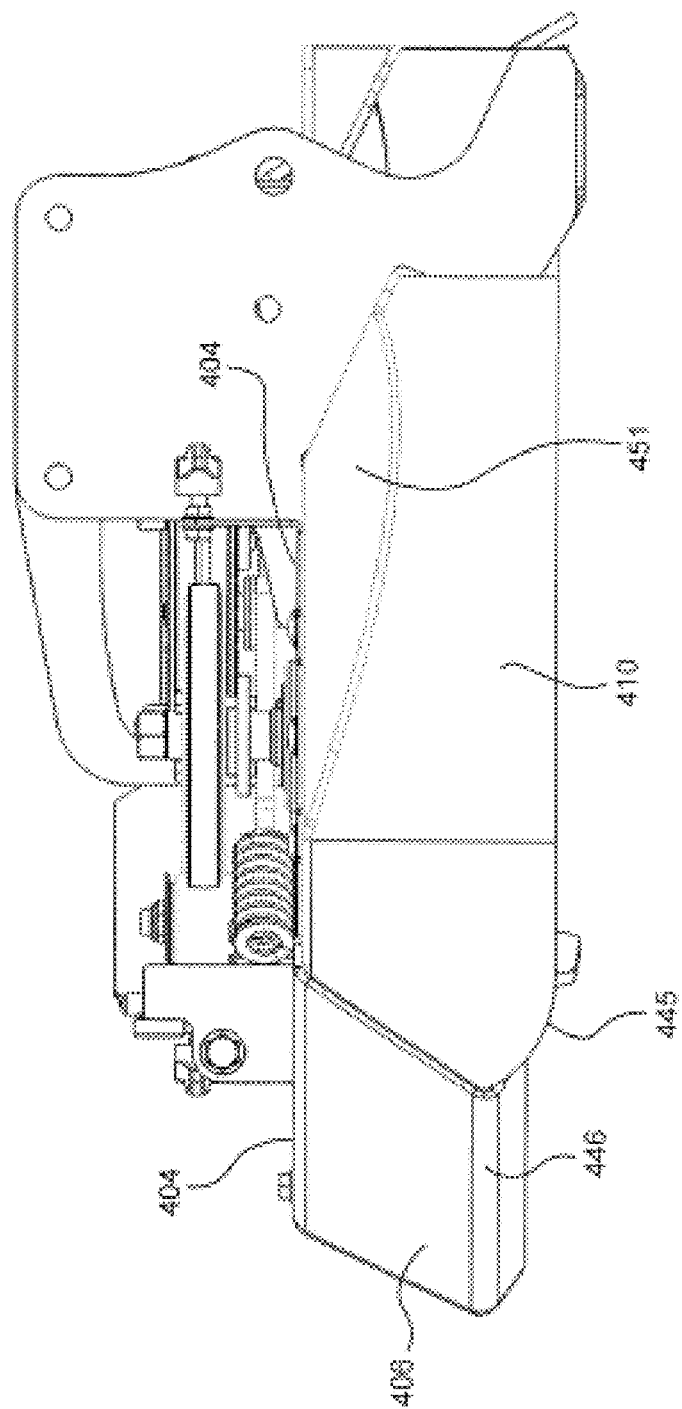
FIG. 16 is a plan view from the left side of the cutter deck structure of FIGS. 9-15.
Figure 17:
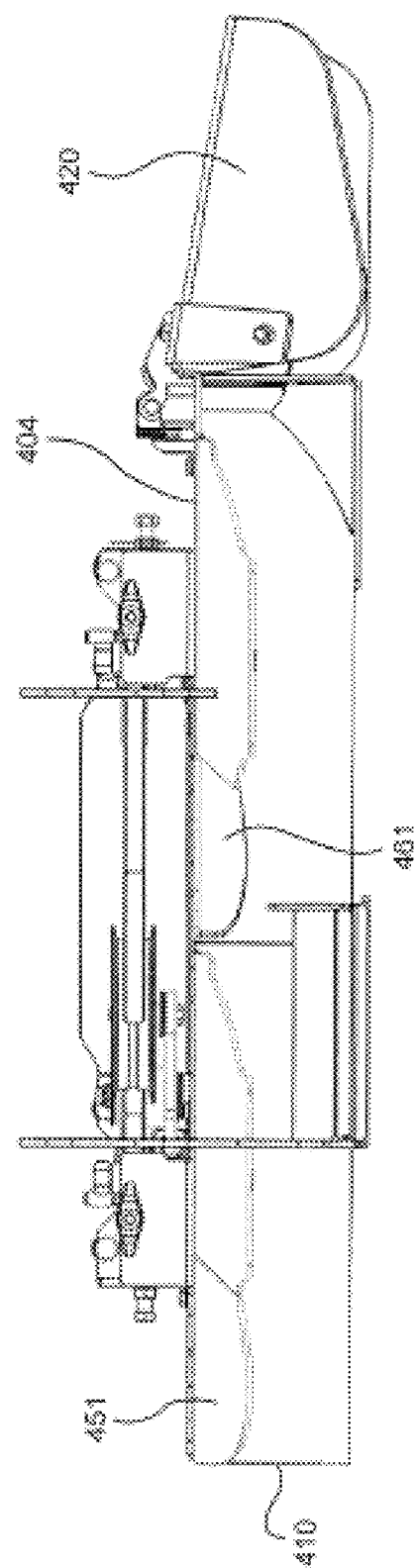
FIG. 17 is a rear plan view of the cutter deck structure of FIGS. 9-16.

In certain example embodiments of this invention, a lawn mower may be a stand-on mower, a sit-down mower, or a walk behind mower. The mower includes for example a combustion engine and an engine deck such as those illustrated in FIGS. 1-3 or of any other suitable type for stand-on, sit-down, or walk behind mowers. Cutter deck structures according to example embodiments of this invention (e.g., see FIGS. 5-17) may be provided on any suitable type of mower including but not limited to a stand-on mower, a sit-down mower, or a walk behind mower. In certain example embodiments of this invention the cutter deck structure may include one or more of: (a) cutter deck baffle teeth for improving cutting performance; (b) a trim divider edge portion of the cutter deck for improving cutting performance; (c) a trim vacuum structure portion of the cutter deck for improving cutting performance; and/or (d) a center vacuum structure portion of the cutter deck for improving cutting performance.

FIGS. 5-8 illustrate a cutter deck structure for use on a lawn mower according to an example embodiment of this invention. FIG. 5 is a top front perspective view of the cutter deck structure; FIG. 6 is a top view of the cutter deck structure; FIG. 7 is a bottom view of the cutter deck structure; and FIG. 8 is a perspective view from the bottom right/rear of the cutter deck structure assuming it is mounted on a mower such as a stand-on, sit-down, or walk behind mower. The cutter deck structure may be rigidly connected to a frame or engine deck of the mower, or may be suspended from a frame of the mower allowing the cutter deck structure to be lifted/lowered relative to the frame by a deck lift system and allowing the cutter deck structure to follow changes in ground contour. The cutter deck structure of FIGS. 5-8 may include a plurality of cutting blades 400, 401, 402 for cutting grass especially when the mower is traveling forward in direction TD and which rotate in direction D when cutting grass, a deck top surface 404, a forward housing portion including a front wall 406 (or deck nose) that extends downwardly from the top surface 404 toward the ground during normal mower operation, front anti-scalp rollers/wheels 408, side wall 410 on the trim side of the deck structure that extends downwardly from the top surface 404 toward the ground during normal mower operation, rear wall 412, substantially curved rear housing walls 415, 416, 417 which may be arc-shaped as shown in FIGS. 7-8 and which help define the cutting chambers 419, 421, 423 respectively of the cutter deck structure and which extend downwardly from the top surface 404 toward the ground during normal mower operation, arc-shaped trim baffle 418 which is also substantially curved as shown in FIGS. 7-8 and which helps define at least a front and/or side portion of the trim cutting chamber 419 of the cutter deck structure which is the cutting chamber farthest from the pivotal chute 420 and which trim baffle 418 also extends downwardly from the top surface 404 toward the ground during normal mower operation, baffle teeth 429 defined in the trim baffle 418 for improving grass cutting quality, discharge baffle 426 which helps direct cut grass out of the cutter deck structure through the opening 427 proximate chute 420, inner baffle 430 which substantially curves back and forth and which helps form the forward portions of cutting chambers 419, 421, 423, top vertical wall 432 which extends upward from the top surface 404 and which encompasses or substantially encompasses an area which includes pulleys 434 and belts 436 that drive the blades (note that the loop 438 in a belt 436 may be driven by a spindle/pulley from the engine). The baffles are used to modify air and grass flow within the deck housing. The majority of components of the deck structure may be metal (e.g., cast metal, stamped sheet steel) or composite construction in various embodiments of this invention.

The baffle teeth 429 are defined in the edge of the trim baffle 418 closest to the ground, and extend downward toward the ground in front of rotating cutting blade 400. It has surprisingly been found that the baffle teeth 429 act as a guide to direct vegetation (e.g., grass) to be cut into the pathway of the rotating blade in order to improve the cutting quality of the mower. Mowers with rotating blades commonly have a housing forming a chamber partly surrounding the blade. This housing and/or internal baffle makes contact with the vegetation before the blade. Vegetation, especially when overgrown, is deflected from contacting the blade thereby resulting in poor cutting performance/quality. This problem is addressed by baffle teeth 429 (including at least one tooth) that is/are defined in the bottom edge of the trim baffle 418 closest to the ground during normal mower operations. Baffle teeth 429 reduces deflection of the vegetation (e.g., grass) by the trim baffle 418 thereby reducing the degree to which vegetation is deflected around the side of the deck—this helps force the vegetation into the path of the rotating cutting blade 400 to improve the quality of cut (e.g., the amount of grass which is cut especially when the grass is slightly overgrown). The baffle teeth 429 reduce or prevent grass from sliding around the edge of the cutter deck structure during mowing operations and remaining uncut. In the example embodiment best shown in FIG. 8, the baffle teeth are in a sawtooth pattern on the inner baffle 418. However, the teeth may be formed in other manners in alternative embodiments of this invention such as via bolt studs and/or weld bumps on the bottom edge of one or both of the inner baffle 418 and/or front wall (deck nose) 406. The teeth are thus advantageous in that they provide for a more accurate and consistent cut on the trim side of the mower, especially when vegetation is overgrown. In preferred embodiments of this invention, the baffle teeth 429 are provided only on the trim side of the cutter deck structure (i.e., not on the discharge side of the cutter deck structure where the discharge opening and chute 420 are located).

Furthermore, the turbulence and centrifugally flowing air near the blade-tip path tends to blow vegetation away from cutting the edge of the blade. Therefore the toothed baffle 418, 429 (and trim divider discussed below) in preferably located in close proximity to blade-tip path so as to be more advantageous than a location more distant location from blade tip.

While the baffle teeth 429 are provided on a cutter deck structure having three cutting blades in the FIG. 5-8 embodiment, baffle teeth according to other embodiments of this invention may be used in other cutter deck structures such as two-blade cutter deck structures such as the embodiment shown in FIGS. 9-17. In particular, the baffle teeth 429 shown in the FIG. 9-17 embodiment function in the same advantageous manner as the baffle teeth 429 in the FIG. 5-8 embodiment; and provide the same improved quality of cut discussed above.

FIGS. 9-17 illustrate a cutter deck structure for use on a lawn mower according to another example embodiment of this invention. The cutter deck structure may be rigidly connected to a frame or engine deck of the mower, or may be suspended from a frame of the mower allowing the cutter deck structure to be lifted/lowered relative to the frame by a deck lift system and allowing the cutter deck structure to follow changes in ground contour. The cutter deck structure of FIGS. 9-17 may include two cutting blades 400, 402 for cutting grass especially when the mower is traveling forward in direction TD and which rotate in direction D when cutting grass, a deck top surface 404, a forward housing portion including a front wall 406 (or deck nose) that extends downwardly from the top surface 404 toward the ground during normal mower operation, side wall 410 on the trim side of the deck structure that extends downwardly from the top surface 404 toward the ground during normal mower operation, rear wall 412, substantially curved rear housing walls 415, 417 which may be arc-shaped and which help define the cutting chambers 419, 423 respectively of the cutter deck structure and which extend downwardly from the top surface 404 toward the ground during normal mower operation, arc-shaped trim baffle 418 which is also substantially curved and which helps define at least a front and/or side portion of the trim cutting chamber 419 of the cutter deck structure which is the cutting chamber farthest from the pivotal chute 420 and which trim baffle 418 also extends downwardly from the top surface 404 toward the ground during normal mower operation, baffle teeth 429 defined in the trim baffle 418 for improving grass cutting quality as discussed above, discharge baffle 426 which helps direct cut grass out of the cutter deck structure through the discharge opening 427 proximate pivotal chute 420, inner baffle 430 which helps form the forward portions of cutting chambers 419, 423, diverter edge 445, inclined surface 451, and top vertical wall 432 which extends upward from the top surface 404 and which encompasses or substantially encompasses an area which includes pulleys 434 and belts 436 that drive the blades (note that the loop 438 in a belt 436 may be driven by a spindle/pulley from the engine). The baffles are used to modify air and grass flow within the deck housing. The majority of components of the deck structure may be metal (e.g., cast metal, stamped sheet steel) or composite construction in various embodiments of this invention.

In the FIG. 9-17 embodiment, diverter edge 445 is provided for improving cut quality. The diverter edge 445 is comprised of an extension of the side housing 410 which extends downwardly to an elevation below an elevation at which the leading edge 446 of the cutter deck structure is provided (e.g., see FIG. 16). This diverter edge/extension acts 445 to reduce or prevent long vegetation (e.g., grass) from sliding around the edge of the cutter deck structure during mowing operations thereby increasing the performance of the cutter deck structure. Thus, the diverter edge 445 is also advantage for improving grass cutting quality. The diverter edge 445 may or may not be used in conjunction with the baffle teeth 429 in different embodiments of this invention.

In the FIG. 9-17 embodiment, a trim vacuum structure is provided by providing an inclined surface 451 between the top 404 and trim side 410 of the cutter deck housing. The inclined surface 451 encourages and helps provide a high pressure zone within the rear portion of the cutter deck housing and a low pressure zone on the trim side of the cutter deck structure. The low pressure zone generated at the trim side of the cutter deck structure encourages and helps vegetation to be pulled into the trim side cutting chamber 419 thereby improving the cutting width of the cutter deck structure and allowing the mower to more efficiently cut vegetation near obstacles. The rotating blades 400, 402 within the cutter deck housing cause air to flow in a circular fashion D. The cutter blade 400 generally has some type of wing 400a creating low pressure below the blade 400 pulling vegetation into the path of the rotating blade 400 and a high pressure area above the blade 400. However, it has been found that it is more desirable for low pressure to be provided where vegetation enters the cutter deck structure while the cutter deck is being moved across the ground during mower operations. The inclined surface 451 provides for a trim side depression from the top 404 of the blade housing where the rotating air flow in the housing is at first compressed thereby discouraging the low pressure zone below the blade 400, and then permitted to expand thereby encouraging the low pressure zone below the blade 400 on the trim side of the cutter deck structure. This expansion of the rotating air column on the trim side of the cutter deck structure pulls vegetation into the path of the blade 400 so as to extend the efficiency and effective cutting width of the mower on which the cutter deck structure is mounted. In example embodiments of this invention, the inclined surface 451 may be inclined at an angle of from about 15 to 50 degrees, more preferably from about 20 to 40 degrees, relative to the substantially planar top surface 404 of the cutter deck structure. Moreover, the inclined surface 451 is preferably extending downwardly, as viewed from above (in a direction determined by how a string laid on the inclined surface 451 would align due to gravity if there was no friction on the surface), at an angle of from about 30-60 degrees, more preferably from about 40-50 degrees, relative to the forward travel direction (TD) of the mower during mower operations in order to increase vacuum at the trim side of the cutter deck assembly and improve cutting characteristics of the mower. The inclined surface 451 that forms the trim side depression may or may not be used in conjunction with diverter edge 445 and/or baffle teeth 429 in different embodiments of this invention.

In the FIG. 9-17 embodiment, an inclined surface 461 may also be provided between the top surface 404 and rear wall 412 in order to form a center vacuum depression. The inclined surface 461 encourages and provides, for a high pressure zone within the rear portion of the cutter deck housing and a low pressure zone at the side of the cutter deck housing. The low pressure zone generated at the side of the housing causes vegetation to be pulled into the path of the blade 402. Traditional cutter deck structures are known to perform poorly in the region between blades thereby causing "furrowing." The inclined surface 461, and the low pressure zone created thereby, addresses this problem and causes vegetation to be pulled into the path of the rotating blade 402 thereby improving mower performance and cutting quality in the region between the blades 400, 402. In example embodiments of this invention, the inclined surface 461 may be inclined at an angle of from about 15 to 50 degrees, more preferably from about 20 to 40 degrees, relative to the substantially planar top surface 404 of the cutter deck structure. Moreover, the inclined surface 461 is preferably extending downwardly, as viewed from above (in a direction determined by how a string laid on the inclined surface 451 would align due to gravity if there was no friction on the surface), at an angle of from about 0-20 degrees, more preferably from about 0-10 degrees, relative to the forward travel direction (TD) of the mower during mower operations in order to provide the best vacuum characteristics in this location. The inclined surface 461 that forms the trim side depression may or may not be used in conjunction with diverter edge 445, inclined surface 451, and/or baffle teeth 429 in different embodiments of this invention.

While the inventions have been described in connection with what is presently considered to be the most practical and preferred embodiment, it is to be understood that the inventions are not to be limited to the disclosed embodiments, but on the contrary, are intended to cover various modifications and equivalent arrangements included within the spirit and scope of the appended claims.

The invention claimed is:

1. A side-discharge lawn mower comprising:
   an engine for driving a plurality of rotating cutting blades that are part of a cutter deck structure, the plurality of cutting blades comprising first and second cutting blades, wherein the first and second cutting blades are located in first and second adjacent cutting chambers of the cutter deck structure, respectively;
   wherein the first cutting chamber includes a first curved wall defining at least part of a rear portion of the first cutting chamber;
   wherein the second cutting chamber includes a second curved wall defining at least part of a rear portion of the second cutting chamber;
   wherein the second cutting chamber is provided between at least a side-discharge opening of the cutter deck structure and the first cutting chamber, so that the first cutting chamber is located at a trim side of the cutter deck structure which is the side of the cutter deck structure opposite the side of the cutter deck structure where the side-discharge opening is located; and
   wherein the cutter deck structure further comprises an inclined surface in the first cutting chamber at the trim side of the cutter deck structure so that at least part of the inclined surface is located closer to the trim side of the cutter deck structure than is any cutting blade rotational axis, the inclined surface extending downwardly from a substantially planar upper surface of the cutter deck structure toward at least the trim side of the cutter deck structure so that the inclined surface is located at the trim side of the cutter deck structure opposite the side of the mower where the side-discharge opening is located, wherein the inclined surface slopes downwardly from the substantially planar upper surface in a direction away from the side-discharge opening;
   wherein, as viewed from below, a perimeter of the inclined surface is defined by a first straight side, a second straight side, and a curved side, wherein the curved side is located between and connecting the first and second straight sides, and wherein the first straight side is at least twice as long as the second straight side; and
   wherein the inclined surface is configured to help provide a high pressure zone within a rear portion of the cutter deck structure and a low pressure zone on the trim side of the cutter deck structure for helping vegetation to be cut to be pulled into the trim side cutting chamber which is the first cutting chamber, and wherein the inclined surface is inclined at an angle of from about 15 to 50 degrees relative to the substantially planar upper surface of the cutter deck structure.

2. The mower of claim 1, further comprising another inclined surface located in the second cutting chamber, wherein the another inclined surface is provided at least partially at a side of the second cutting chamber opposite a side of the second cutting chamber closest to the side discharge opening, and wherein the another inclined surface is inclined at an angle of from about 15 to 50 degrees relative to the substantially planar upper surface of the cutter deck structure.

3. The mower of claim 1, wherein the inclined surface is inclined at an angle of from 20 to 40 degrees relative to the substantially planar upper surface of the cutter deck structure.

4. The mower of claim 1, wherein the side discharge opening is defined in a side of the second cutting chamber.

* * * * *